(12) United States Patent
Jin et al.

(10) Patent No.: US 6,860,159 B2
(45) Date of Patent: Mar. 1, 2005

(54) ROTATION SENSOR

(75) Inventors: Dongzhi Jin, Tokyo (JP); Fumihiko Abe, Tokyo (JP); Masahiro Hasegawa, Tokyo (JP); Tsuyoshi Nakamoto, Tokyo (JP); Kengo Tanaka, Tokyo (JP); Kazuhiko Matsuzaki, Tokyo (JP); Kosuke Yamawaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 216 days.

(21) Appl. No.: 10/029,540

(22) Filed: Dec. 20, 2001

(65) Prior Publication Data

US 2002/0078764 A1 Jun. 27, 2002

(30) Foreign Application Priority Data

Dec. 21, 2000 (JP) ........................................ 2000-388954

(51) Int. Cl.⁷ ............................. G01L 3/12; G01L 3/14
(52) U.S. Cl. ............................. 73/862.331; 73/862.33; 73/5
(58) Field of Search .................... 73/862.331, 862.335, 73/862.333, 862.336, 862.334

(56) References Cited

U.S. PATENT DOCUMENTS

| | | | |
|---|---|---|---|
| 2,498,282 A | | 2/1950 | Langer |
| 3,890,515 A | * | 6/1975 | Fehr et al. .................. 310/104 |
| 4,412,198 A | * | 10/1983 | Reich ......................... 336/120 |
| 4,724,710 A | | 2/1988 | Murty |
| 4,876,899 A | | 10/1989 | Strott et al. |
| 4,881,414 A | * | 11/1989 | Setaka et al. ........... 73/862.331 |
| 4,907,460 A | | 3/1990 | Taniguchi et al. ...... 73/862.331 |
| 4,972,725 A | | 11/1990 | Choisnet ................ 73/862.337 |
| 5,046,372 A | | 9/1991 | Taniguchi et al. ...... 73/862.335 |
| 5,083,468 A | | 1/1992 | Dobler et al. ........... 73/862.331 |
| 5,195,382 A | | 3/1993 | Peilloud ..................... 324/209 |
| 5,578,767 A | | 11/1996 | Chikaraishi et al. ... 73/862.331 |
| 5,637,997 A | | 6/1997 | Hore et al. ............ 324/207.16 |
| 5,796,014 A | | 8/1998 | Chikaraishi et al. ..... 73/862.28 |
| 6,481,296 B2 | | 11/2002 | Jin et al. ................ 73/862.331 |
| 6,532,831 B2 | | 3/2003 | Jin et al. ................ 73/862.331 |

FOREIGN PATENT DOCUMENTS

| | | |
|---|---|---|
| JP | 01-244322 | 9/1989 |
| JP | 01244322 | 9/1989 |
| JP | 5-22836 | 11/1993 |
| JP | 2001-004314 | 6/1999 |
| WO | WO 01/67059 A1 | 9/2001 |

* cited by examiner

*Primary Examiner*—Edward Lefkowitz
*Assistant Examiner*—Lilybett Martir
(74) *Attorney, Agent, or Firm*—Knobbe, Martens, Olson & Bear, LLP

(57) ABSTRACT

The rotation sensor (10) has a cylindrical first rotor (11) made of an insulating magnetic material, having conductor layers (11a) arranged circumferentially, the first rotor being attached to a rotating first shaft (5a) at a predetermined axial position; a fixed core (12) having an exciting coil (12b), the core being fixed to a fixing member with a space secured in the axial direction with respect to the first shaft; a second rotor (13) having nonmagnetic metal bodies (13b) arranged circumferentially to oppose the conductor layers respectively, the second rotor being attached to a second shaft located adjacent to and rotating relative to the first shaft (5a) and being located between the first rotor (11) and the fixed core (12); and oscillating device connected to the exciting coil (12b), the oscillating device transmitting an oscillation signal of a specific frequency. The rotation sensor has rotation guides (11c,13c) for guiding rotation of the first and second rotors (11,13) respectively with respect to the fixed core (12).

13 Claims, 5 Drawing Sheets

ROTATION SENSOR

FIELD OF THE INVENTION

The present invention relates to a rotation sensor.

BACKGROUND OF THE INVENTION

There is known, as a rotation sensor having a pair of rotors and a stator containing an exciting coil and detecting a running torque between two shafts rotating relative to each other, for example, one which is utilized for smooth electronic control of a steering device. The sensor detects a running torque in an automotive handle shaft having two rotating shafts rotating relative to each other and connected to each other through a torsion bar (see, for example, Examined Japanese Patent Publication(Kokoku) No. Hei 7-21433).

Here, in the conventional rotation sensor described above, the rotors are fixed beforehand to the rotating shafts respectively, and a rotation guide such as a bearing is interposed between the stator and each rotating shaft to achieve alignment of the rotating shafts of these two rotors with the central axis of the exciting coil in the stator.

However, according to the above constitution, the rotation sensor must be manufactured or assembled integrally with two rotating shafts rotating relative to each other to impose design limitation on a target to which the rotation sensor is attached, e.g., a steering device. In addition, the rotation sensor generally needs adjustment of sensitivity and output range, and when it is integrated into the rotating shafts, such adjustments are carried out after completion of assembly. Therefore, the resulting rotation sensor involves problems that the adjusting mechanisms are enlarged and complicated due to upsizing by integration into the rotating shafts.

SUMMARY OF THE INVENTION

It is an object of the present invention to provide a rotation sensor, which need not be manufactured integrally with rotating shafts but can be post-fitted thereto, which imposes no design limitation on a target to which the rotation sensor is attached, and which can be downsized.

In the present invention, in order to attain the above object, the rotation sensor contains a cylindrical first rotor made of an insulating magnetic material, having conductor layers arranged circumferentially, the first rotor being attached to a rotating first shaft at a predetermined axial position; a fixed core having an exciting coil, the core being fixed to a fixing member with a space secured in the axial direction with respect to the first shaft; a second rotor having nonmagnetic metal bodies arranged circumferentially to oppose the conductor layers respectively, the second rotor being attached to a second shaft located adjacent to and rotating relative to the first shaft and being located between the first rotor and the fixed core; and oscillating means connected to the exciting coil, the means transmitting an oscillation signal of a specific frequency; wherein the rotation sensor is provided with rotation guides for guiding rotation of the first rotor and the second rotor respectively with respect to the fixed core.

Preferably, the rotation guides are a first guide ring and a second guide ring formed on the first rotor and on the second rotor respectively and are engaged with the fixed core.

Preferably, the rotation guides are bearings interposed between the first rotor and the fixed core and between the second rotor and the fixed core, respectively.

These and other objects, aspects and advantages of the invention will become more apparent from the following detailed description, taken in conjunction with the accompanying drawings.

DETAILED DESCRIPTION

Figure 1:
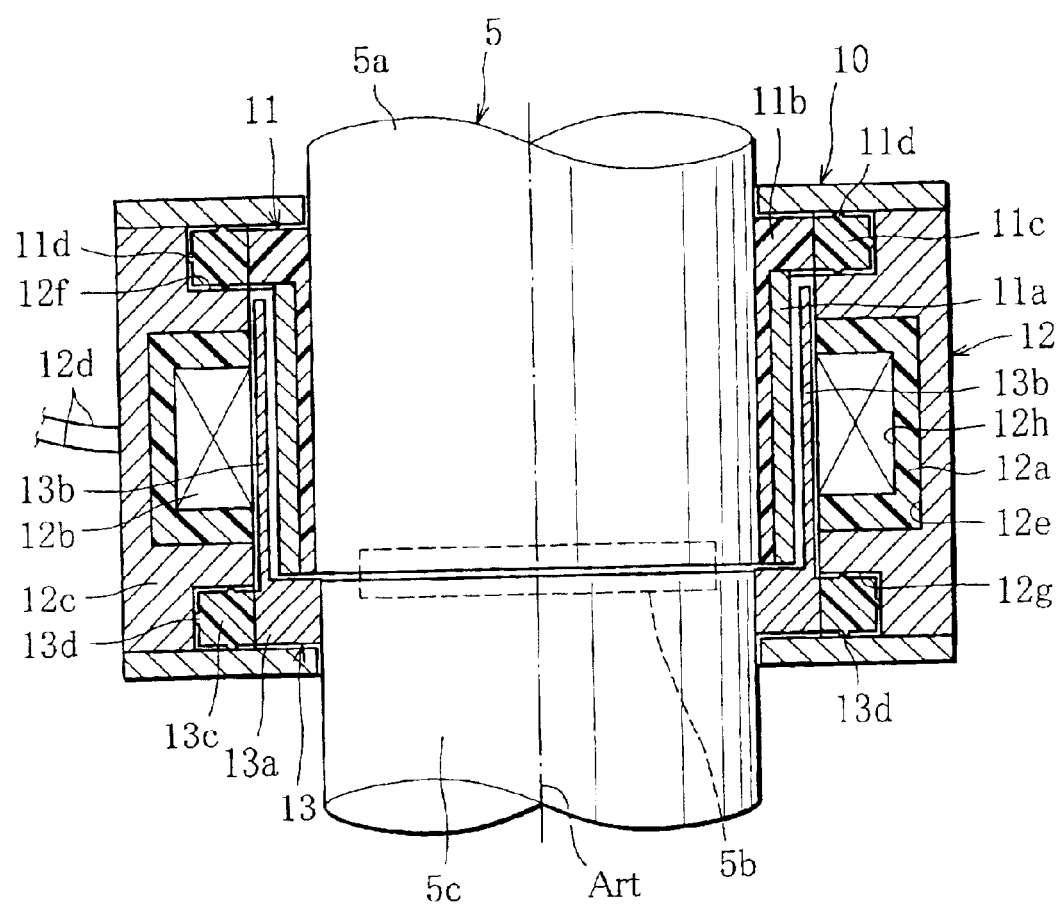
FIG. 1 is a cross-sectional view showing a rotation sensor according to a first embodiment of the present invention.

The present invention will be described below by way of embodiments realized in a rotation sensor for detecting a running torque, for example, in an automotive steering shaft to be transmitted from a main driving shaft to a driven shaft through a converting joint (torsion bar) referring to FIGS. 1 to 5.

A rotation sensor according to a first embodiment of the invention will be described first. The rotation sensor 10 is provided with a first rotor 11, a fixed core 12, a second rotor 13 and a relative rotation angle measuring device 14 and is attached to a steering shaft 5. Here, the steering shaft 5 has a main driving shaft 5a and a driven shaft 5c connected to each other through a torsion bar 5b. The main driving shaft 5a is oriented relative to the driven shaft 5c such that the former rotates at an angle of ±8° relative to the latter.

The first rotor 11 is formed to have a cylindrical shape using an insulating magnetic material prepared by admixing 10 to 70% by volume of powdery soft magnetic material to a thermoplastic synthetic resin having electrical insulating properties. The first rotor 11 is post-fitted to the rotating main drive shaft 5a at an axial predetermined position. Such thermoplastic synthetic resins employable here include nylon, polypropylene (PP), polyphenylene sulfide (PPS), ABS resins, etc. Meanwhile, powdery soft magnetic materials employable here include Ni—Zn and Mn—Zn ferrite powders. The first rotor 11 has on the periphery six sheets of copper foils 11a arranged circumferentially at predetermined intervals, for example, at 30°-central angle intervals, in FIG. 1. The first rotor 11 has a flange 11b formed at the top to extend radially outward. The flange 11b has a first guide ring 11c on the periphery.

The first guide ring 11c is ring-shaped and is engaged with a step 12f (to be described later) of the fixed core 12 to guide rotation of the first rotor 11 with respect to the fixed core 12. For that reason, the first guide ring 11c is made of the same material as used for a second guide ring 13c (to be described later), for example, a metal such as a copper alloy and aluminum or a synthetic resin. The first guide ring 11c has a multiplicity of protrusions 11d formed on the periphery and on the upper and lower surfaces and arranged circumferentially so as to reduce friction with the fixed core 12. It should be noted here that the first guide ring 11c may have ridges 11e extended in the circumferential direction in place of the protrusions 11d so long as the intended purpose is attained.

Meanwhile, the copper foils 11a may be replaced with any other conductor layer such as of aluminum or silver, and these conductor layers including the copper foils 11a may be embedded in the insulating magnetic material.

The fixed core 12, which is located at the outermost position coaxially with the first rotor 11 with a very small gap of about several millimeters secured radially, is fixed to a fixing member (not shown) located in the vicinity of the steering shaft 5 by means of post-fitting. The fixed core 12 has a core body 12a, an exciting coil 12b housed in the core body 12a and a metallic shielding case (hereinafter simply referred to as "case") 12c for containing the core body 12a. The core body 12a is made of the same insulating magnetic material as used for the first rotor 11 and has a ring shape with a groove 12h for containing the exciting coil 12b. The exciting coil 12b is connected to a signal processing circuit (not shown) with electric cables 12d (see FIG. 1) extended externally from the case 12c. An alternating current is supplied from this signal processing circuit. The case 12c is made of a metal such as aluminum and copper, having a property of shielding alternate current magnetic field and has a ring shape with a groove 12e for containing the core body 12a. Here, the case 12c has on the inner surface thereof an upper step 12f and a lower step 12g which are engaged with the first and second guide rings 11c and 13c respectively.

The second rotor 13 is interposed between the first rotor 11 and the fixed core 12, as shown in FIG. 1, and is post-fitted to the driven shaft 5c which rotates relative to the main driving shaft 5a. The second rotor 13 is made of a metal having a property of shielding alternate current magnetic field, such as aluminum and copper, and has at the bottom a mounting flange 13a to be fixed to the driven shaft 5c. The mounting flange 13a has six louver boards 13b formed to rise from the periphery thereof parallel to the rotational axis Art and arranged circumferentially and equally at 60°-central angle intervals and to oppose the copper foils 11a respectively.

Here, the second rotor 13 has on the periphery of the mounting flange 13a a second guide ring 13c formed integrally therewith, like the first rotor 11. The second guide ring 13c is ring-shaped and has a multiplicity of protrusions 13d formed on the periphery and on the upper and lower surfaces and arranged circumferentially so as to be engaged with the step 12g (to be described later) of the fixed core 12 under low friction and to guide rotation of the second rotor 13 with respect to the fixed core 12. The second guide ring 13c may have ridges extended in the circumferential direction in place of the protrusions 13d.

The rotation sensor 10 having the constitution as described above is incorporated into a steering device by means of post-fitting by attaching the first rotor 11 and the second rotor 13 to the main driving shaft 5a and to the driven shaft 5c, respectively, and fixing the fixed core 12 to the fixing member.

In the thus assembled rotation sensor 10, a magnetic flux induced by the alternate current flowing through the exciting coil 12b flows along a magnetic circuit formed of the insulating magnetic material of the core body 12a and the first rotor 11. Thus, the alternate current magnetic field traverses the copper foils 11a of the first rotor 11 to induce an eddy current within the copper foils 11a.

Here, the direction of the alternate current magnetic field excited by the eddy current is opposite to that of the alternate current flowing through the exciting coil 12b. Consequently, the direction of the magnetic flux induced by the exciting alternate current of the exciting coil 12b generated in such portions of the gap between the core body 12a and the first rotor 11, where the copper foils 11a are present, and the direction of the magnetic flux induced by the eddy current are opposite to each other, so that the total magnetic flux density is reduced. On the contrary, in the portions of the gap where no copper foil 11a is present, the magnetic flux induced by the exciting alternate current of the exciting coil 12b and the magnetic flux induced by the eddy current are of the same direction, so that the total magnetic flux density is increased. In other words, a nonuniform magnetic field is formed in the gap between the core body 12a and the first rotor 11.

Therefore, in the rotation sensor 10, when the second rotor 13 rotates relative to the first rotor 11, the louver boards 13b formed at 60°-central angle intervals on the second rotor 13 traverse the nonuniform magnetic field. Here, the amount of total magnetic flux which the louver boards 13b traverse changes under relative rotation of the first rotor 11 and the second rotor 13, so that the intensity of the eddy current occurring in the louver boards 13b changes. Thus, in the rotation sensor 10, impedance of the exciting coil 12b fluctuates depending on the relative rotation angle between the first rotor 11 and the second rotor 13.

In the rotation sensor 10 of this embodiment, the fluctuation of impedance in the exciting coil 12b is measured by detecting the amount of phase shift in pulse signals.

Figure 2:
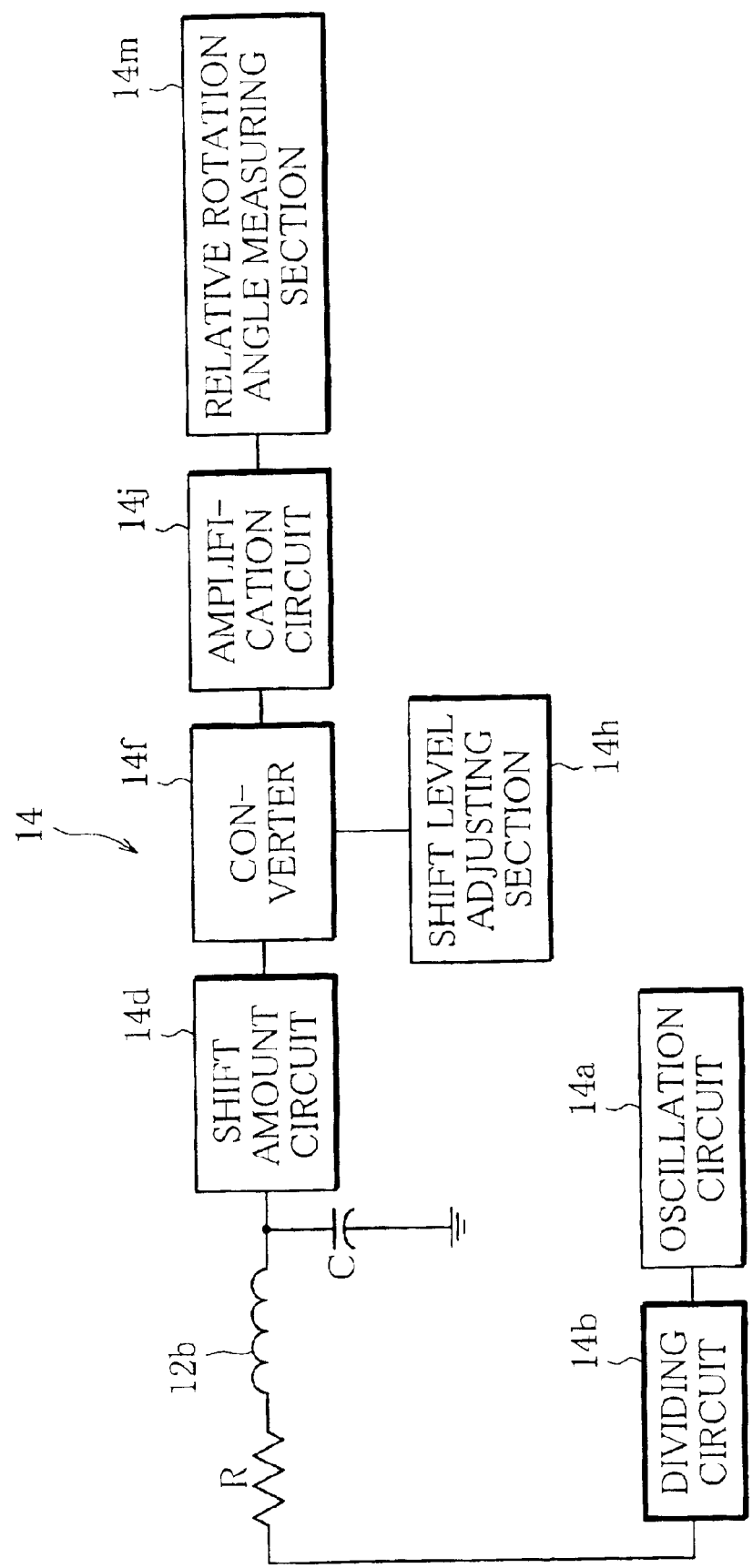
FIG. 2 is a circuit block diagram showing an example of relative rotation angle measuring device in the rotation sensor of FIG. 1.
Figure 3:
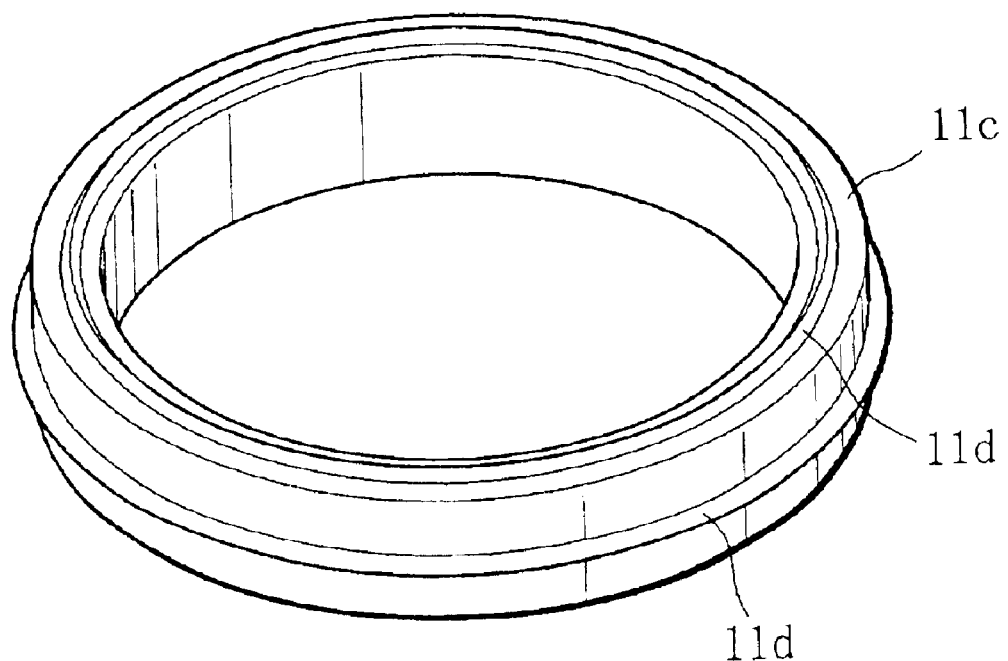
FIG. 3 is a perspective view of a guide ring used in a first rotor.

Next, measurement of the relative rotation angle with the rotation sensor 10 will be described referring to FIG. 2. FIG. 2 is a circuit block diagram showing an embodiment of relative rotation angle measuring device 14 to be used in the rotation sensor 10.

In FIG. 2, the measuring device 14 constitutes oscillating means of the rotation sensor 10 and has an oscillation circuit 14a which transmits an oscillation signal, a dividing circuit 14b which divides the oscillation signal to output a pulse signal of a specific frequency, a shift amount circuit 14d for detecting a phase shift amount (to be described later), a converter 14f for converting the detected phase shift amount to a corresponding voltage value, a shift level adjusting section 14h for adjusting the shift level of that voltage value, an amplification circuit 14j for amplifying the voltage corresponding to the phase shift amount output from the converter 14f and a relative rotation angle measuring section 14m for measuring a relative rotation angle based on the amplified voltage value.

The oscillation circuit 14a outputs a pulse signal of a specific frequency through the dividing circuit 14b to a resonant circuit containing a resistor R, the exciting coil 12b and a condenser C as shown in FIG. 2. The fluctuation in impedance of the exciting coil 12b changes the phases of the voltage signals at both ends of the condenser C. The voltage signals at both ends of the condenser C are output to the shift amount circuit 14d.

The shift amount circuit 14d detects the phase shift amount of the voltage signal at each end of the condenser C. The converter 14f converts the detected phase shift amount to a corresponding voltage value, while the shift level adjusting section 14h adjusts the voltage level of the signal output from the converter 14f and outputs the adjusted voltage value to the amplification circuit 14j. The amplification circuit 14j amplifies the voltage level of the signal output from the converter 14f to output the amplified voltage value to the relative rotation angle measuring section 14m.

The relative rotation angle measuring section 14m measures the relative rotation angle between two rotors 11 and 13 with high accuracy within the range of −8° to +8° based on the signal (voltage value) input from the amplification circuit 14j.

Therefore, the rotation sensor 10 can determine the running torque acting between the main driving shaft 5a and the driven shaft 5c depending on the relative rotation angle, based on the relationship between the running torque acting between these two shafts 5a and 5c having been determined beforehand and the relative rotation angle between them.

Here, the components of the rotation sensor 10 including the first rotor 11, the fixed core 12 and the second rotor 13 are incorporated by means of post-fitting into an intended target, for example, a steering device. Therefore, the rotation sensor 10 need not be manufactured integrally with the rotating shafts, nor it imposes design limitation on an intended target and can be downsized. Further, the rotation sensor 10 can be incorporated into the steering device after adjustment of sensitivity and output range.

In addition, the rotation sensor 10 has, on the first rotor 11, the first guide ring 11c to be engaged with the step 12f of the fixed core 12, and on the second rotor 13, the second guide ring 13c to be engaged with the step 12g of the fixed core 12. This facilitates rotation of the rotors 11 and 13 and improves reliability of the rotation sensor 10 in terms of operation.

Figure 4:
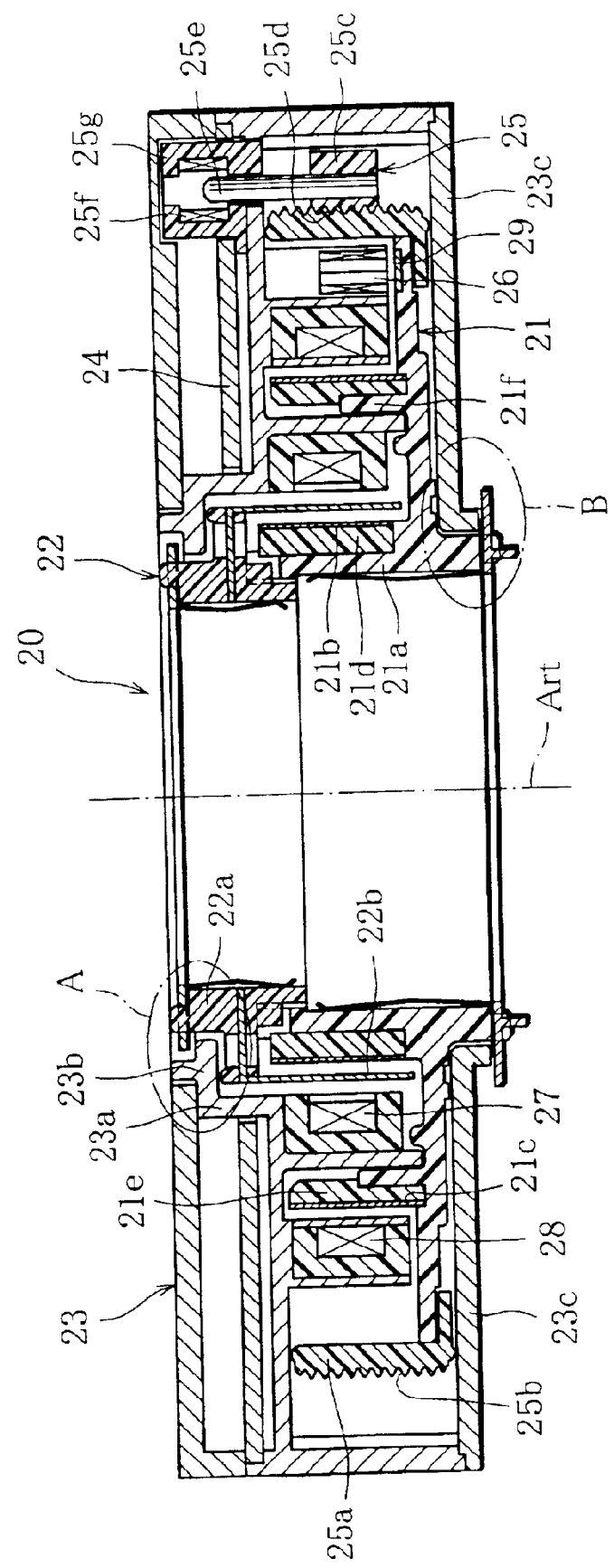
FIG. 4 is a cross-sectional view showing a modification of the rotation sensor shown in FIG. 1.

Here, the rotation sensor of the present invention can be applied to a case where a plurality of rotation sensors are integrated into one body, for example, as in a rotation sensor 20 shown in FIG. 4. The rotation sensor 20 contains two rotation sensors housed in a fixed case to be integrated into a single body. The rotation sensor 20 has a first rotation sensor for detecting the relative rotation angle between a rotating first shaft and a second shaft rotating relative to the first shaft, and a second rotation sensor which detects the relative rotation angle between the rotating first shaft and the fixed case.

The rotation sensor 20 has a first rotor 21, a second rotor 22 and a fixed case 23 and is attached to an intended target, as shown in FIG. 4. In the rotation sensor 20, the inner wall of a flange 23b extended from an inner barrel 23a of the fixed case 23 is abutted against the periphery of an inner barrel 22a of the second rotor 22 as illustrated in section A of FIG. 4; whereas the inner wall of a lower cover 23c of the fixed case 23 is abutted against the lower periphery of an inner barrel 21a of the first rotor 21 as illustrated in section B of FIG. 4, guiding rotation of the first rotor 21 and the second rotor 22 with respect to the fixed case 23, respectively.

The first rotor 21 is made of a thermoplastic synthetic resin and has the inner barrel 21a having a cylindrical form. A flange extended from the inner barrel 21a has a peripheral wall 21f. The synthetic resin employable here includes, for example, nylon, polypropylene (PP) and polybutylene terephthalate (PBT), etc. As shown in FIG. 4, the first rotor 21 has a first ring member 21d and a second ring member 21e on the inner barrel 21a and on the peripheral wall 21f respectively. The first and second ring members 21d and 21e are formed into ring shapes using an insulating magnetic material prepared by admixing 10 to 70% by volume of powdery soft magnetic material to a thermoplastic synthetic resin having electric insulating properties. The thermoplastic synthetic resin employable here includes nylon, polypropylene (PP), polyphenylene sulfide (PPS), ABS resins, etc. Meanwhile, the powdery soft magnetic material employable here includes Ni—Zn and Mn—Zn ferrite powders. The first ring member 21d has on the periphery thereof copper foils 21b formed at the same pitch as that of copper pieces 22b (to be described later). The second ring member 21e has copper foils 21c attached thereto at a central angle of up to 180° and arranged circumferentially on the periphery. Further, the first rotor 21 has a cylindrical screw member 25a attached to the periphery of the flange. The first rotor 21 is provided with an arcuate copper thin plate 29 over the central angle of 180° on the upper surface of the flange.

The second rotor 22 is made of a thermoplastic synthetic resin and has the inner barrel 22a having a cylindrical form. The inner barrel 22a has six copper pieces 22b attached thereto and arranged at 60°-central angle equal intervals. The same synthetic resins as used for the first rotor 21 can be employed here.

As shown in FIG. 4, the fixed case 23 has a first fixed core 27 and a second fixed core 28. These cores 27 and 28 are assembled by housing exciting coils respectively into annular core bodies formed using the same insulating magnetic material as used for the ring members 21d and 21e. The fixed case 23 further contains a circuit board 24, a displacement sensor 25 and a pitch sensor 26.

The circuit board 24 is connected to the exciting coil of the first fixed core 27 and to that of the second fixed core 28 and has a transmitting circuit which transmits a signal of a specific frequency and which converts the signals detected by the first rotation sensor and the second rotation sensor into a relative rotation angle. As described above, the circuit board 24 processes the signals detected by the first rotation sensor and the second rotation sensor respectively.

The displacement sensor 25 detects a change in coil inductance based on the shift of a sliding core 25e (to be described later) in the axial direction of the rotating shaft and detects revolution between the first rotor 21 and the fixed case 23. The displacement sensor 25 contains the screw member 25a, a thread portion 25b, a slider 25c, a thread portion 25d, the sliding core 25e, a coil 25f and a core 25g. The pitch sensor 26 detects if rotational positions of the first and second rotors 21 and 22 are within the angle of 180° in the positive direction or negative direction from the reference position.

In the rotation sensor 20, the first ring member 21d and the second ring member 21e are opposed to the first fixed core 27 and to the second fixed core 28 respectively, and the first rotor 21 is attached rotatably to the second rotor 22. In the rotation sensor 20, six copper pieces 22b are arranged between the first ring member 21d and the fixed core 27, and the second rotor 22 is rotatably attached to the fixed case 23.

Here, the first rotation sensor contains the first ring member 21d, the first fixed core 27 and the copper pieces 22b to allow the circuit board 24 to transmit a signal of a specific frequency to the exciting coil and detects the relative rotation angle between the first rotor 21 and the second rotor 22.

Meanwhile, the second sensor contains the second ring member 21e, the displacement sensor 25, the pitch sensor 26 and the second fixed core 28 to allow the circuit board 24 to output a signal of a specific frequency to the exciting coil and detects relative rotation angle between the first rotor 21 and the fixed case 23.

The rotation sensor 20 having the constitution as described above is incorporated to an intended target, for example, into a steering device by means of post-fitting by attaching the first rotor 21 and the second rotor 22 to the first shaft and to the second shaft respectively. It should be noted here that in the rotation sensor 20, the inner barrel 21a of the first rotor 21 and the inner barrel 22a of the second rotor 22 serve as guide rings corresponding to the first guide ring 11c and the second guide ring 13c of the rotation sensor 10 respectively.

Therefore, the rotation sensor 20, like the rotation sensor 10, need not be manufactured integrally with the rotating shafts nor imposes design limitation on the target to which the rotation sensor is to be attached and can be downsized.

Next, a rotation sensor according to a second embodiment of the present invention will be described. It should be noted here that the same or like elements as in the rotation sensor 10 of the first embodiment will be affixed with the same reference numbers respectively so as to avoid redundant descriptions.

Figure 5:
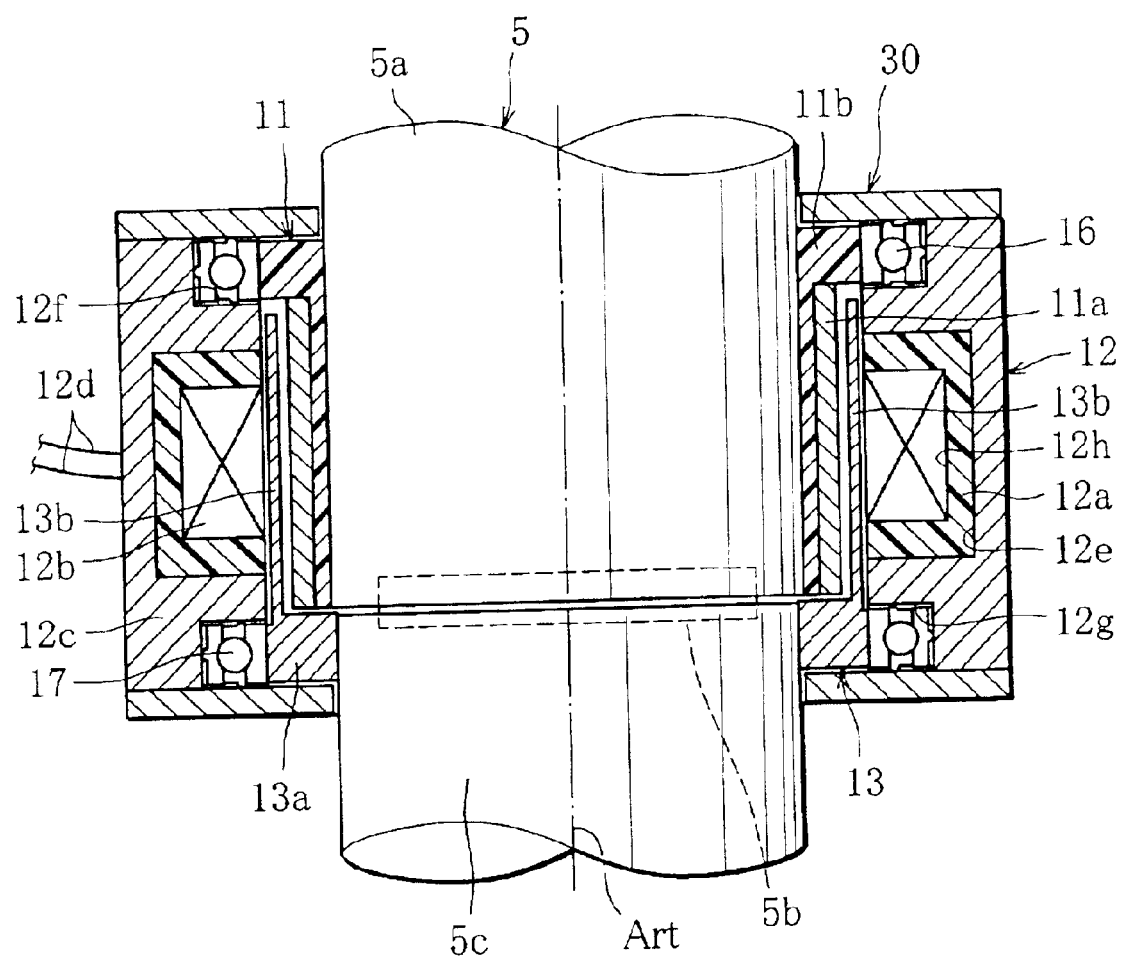
FIG. 5 is a cross-sectional view showing a rotation sensor according to a second embodiment of the present invention.

The rotation sensor 30 contains a first rotor 11, a fixed core 12, a second rotor 13 and a relative rotation angle measuring device 14 (see FIG. 2) as shown in FIG. 5. In the revolution sensor 30, a bearing 16 is interposed between the flange 11b of the first rotor 11 and the step 12f of the fixed core 12, whereas another bearing 17 is interposed between the mounting flange 13a of the second rotor 13 and the step 12g of the fixed core 12.

Therefore, in the rotation sensor 30, since the first rotor 11, the fixed core 12 and the second rotor 13 are incorporated to an intended target such as a steering device by means of post-fitting, like in the rotation sensor 10, the rotation sensor 30 need not be manufactured integrally with rotating shafts nor imposes design limitation on the intended target and can be downsized easily.

It should be noted here, while the embodiments each described a rotation sensor for detecting running torque, the sensors can detect absolute rotation angles.

Furthermore, the rotation sensors according to the present invention can be applied not only to automotive steering shafts as described in the above embodiments but to any other shaft such as robot arms, so long as they are used for determining a relative rotation angle, rotation angles or a running torque between two rotating shafts rotating relative to each other.

What is claimed is:

1. An improved rotation sensor having:
   a cylindrical first rotor made of an insulating magnetic material, having conductor layers arranged circumferentially, the first rotor being attached to a rotating first shaft at a predetermined axial position;
   a core body having an exciting coil, the core body being arranged with a space secured in the radial direction with respect to the first shaft;
   a stator on which the core body is fixed, said stator being fixed to a fixing member;
   a second rotor having a nonmagnetic metal bodies arranged circumferentially to oppose the conductor layers respectively, the second rotor being attached to a second shaft located adjacent to and rotating relative to the first shaft and being located between the first rotor and the stator; and
   oscillating means connected to the exciting coil, the means transmitting an oscillation signal of a specific frequency;
   wherein the improvement comprises:
      a first guide ring formed on the first rotor and engaged with the stator for guiding rotation of the first rotor with respect to the stator; and
      a second guide ring formed on the second rotor and engaged with the stator for guiding rotation of the first rotor with respect to the stator.

2. The rotation sensor according to claim 1, wherein the first and second guide rings obtained by molding a metal or a synthetic resin.

3. The rotation sensor according to claim 2, wherein the first and second guide rings each have a multiplicity of protrusions formed circumferentially on the periphery and on the upper and lower surfaces.

4. The rotation sensor according to claim 1, wherein the first and second guide rings are bearings interposed between the first rotor and the stator and between the second rotor and the stator, respectively.

5. The rotation sensor according to claim 1, wherein the stator contains two exciting coils in the core body.

6. The rotation sensor according to claim 1, wherein the stator has a case for shielding an alternate current magnetic field.

7. An improved rotation sensor having:
   a cylindrical first rotor made of an insulating magnetic material, having conductor layers arranged circumferentially, the first rotor being attached to a rotating first shaft at a predetermined axial position;
   a core body having an exciting coil, the core body being arranged with a space secured in the radial direction with respect to the first shaft;
   a stator on which the core body is fixed, said stator being fixed to a fixing member;
   a second rotor having a nonmagnetic metal bodies arranged circumferentially to oppose the conductor layers respectively, the second rotor being attached to a second shaft located adjacent to and rotating relative to the first shaft and being located between the first rotor and the stator; and
   oscillating means connected to the exciting coil, the means transmitting an oscillation signal of a specific frequency;
   wherein the improvement comprises:
      a first rotation guide arranged between the first rotor and stator and engaged with the stator for guiding rotation of the first rotor with respect to the stator; and
      a second rotation guide arranged between the second rotor and stator and engaged with the stator for guiding rotation of the second rotors with respect to the stator.

8. The rotation sensor according to claim 7, wherein the rotation guides are guide rings obtained by molding a metal or a synthetic resin.

9. The rotation sensor according to claim 8, wherein a first guide ring and a second guide ring are formed on the first and second rotors respectively and are engaged with the stator.

10. The rotation sensor according to claim 9, wherein the first and second guide rings each have a multiplicity of protrusions formed circumferentially on the periphery and on the upper and lower surfaces.

11. The rotation sensor according to claim 7, wherein the first and second rotation guides are bearings interposed between the first rotor and the stator and between the second rotor and the stator, respectively.

12. The rotation sensor according to claim 7, wherein the stator contains two exciting coils in the core body.

13. The rotation sensor according to claim 7, wherein the stator has a case for shielding an alternate current magnetic field.

* * * * *